US010778067B2

United States Patent
Ito et al.

(10) Patent No.: US 10,778,067 B2
(45) Date of Patent: Sep. 15, 2020

(54) ROTARY ELECTRIC MACHINE

(71) Applicant: HONDA MOTOR CO., LTD., Tokyo (JP)

(72) Inventors: Yuta Ito, Saitama (JP); Takuya Yoshizawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/223,446

(22) Filed: Dec. 18, 2018

(65) Prior Publication Data
US 2019/0190349 A1 Jun. 20, 2019

(30) Foreign Application Priority Data
Dec. 19, 2017 (JP) ................................ 2017-243002

(51) Int. Cl.
*H02K 9/19* (2006.01)
*H02K 7/00* (2006.01)
(Continued)

(52) U.S. Cl.
CPC ................. *H02K 9/19* (2013.01); *B60K 6/26* (2013.01); *H02K 1/32* (2013.01); *H02K 7/003* (2013.01);
(Continued)

(58) Field of Classification Search
CPC . B60K 6/26; B60K 6/387; B60K 6/36; B60K 6/40; H02K 7/003; H02K 7/006;
(Continued)

(56) References Cited

U.S. PATENT DOCUMENTS

| 4,798,320 A | * | 1/1989 | Fang | ........................ | F01D 5/025 |
| | | | | | 228/124.1 |
| 4,800,311 A | * | 1/1989 | Weldon | ................... | H02K 31/02 |
| | | | | | 29/598 |

(Continued)

FOREIGN PATENT DOCUMENTS

| JP | 2009-284603 A | 12/2009 |
| JP | 2010-041887 A | 2/2010 |

(Continued)

OTHER PUBLICATIONS

Translation of foreign document JP 2016067117 A (Year: 2016).*
Oct. 1, 2019, Japanese Office Action issued for related JP Application No. 2017-243002.

*Primary Examiner* — Alex W Mok
(74) *Attorney, Agent, or Firm* — Paratus Law Group, PLLC

(57) ABSTRACT

A rotary electric machine includes a rotor, and a rotor shaft connected to the rotor so as to be integrally rotatable and provided with a coolant flow path through which a coolant flows. The rotor shaft includes a first rotor shaft and a second rotor shaft which is inserted into the first rotor shaft and is connected to the first rotor shaft so as to be integrally rotatable. The first rotor shaft includes an opposing surface opposed to a tip surface of the second rotor shaft, and a coolant supply path extending radially from a vicinity of the opposing surface. A gap is provided between the opposing surface of the first rotor shaft and the tip surface of the second rotor shaft. The gap constitutes a connection flow path connecting the coolant flow path and the coolant supply path.

8 Claims, 7 Drawing Sheets

(51) Int. Cl.
*H02K 7/116* (2006.01)
*B60K 6/26* (2007.10)
*H02K 1/32* (2006.01)
*B60K 6/36* (2007.10)
*B60K 6/40* (2007.10)
*B60K 6/387* (2007.10)

(52) U.S. Cl.
CPC ............. *H02K 7/006* (2013.01); *H02K 7/116* (2013.01); *B60K 6/36* (2013.01); *B60K 6/387* (2013.01); *B60K 6/40* (2013.01); *B60Y 2200/92* (2013.01); *B60Y 2306/05* (2013.01); *B60Y 2400/60* (2013.01)

(58) Field of Classification Search
CPC . H02K 7/116; H02K 9/19; H02K 1/32; B60Y 2200/92; B60Y 2306/05; B60Y 2400/60

USPC .......................................................... 310/54
See application file for complete search history.

(56) References Cited

U.S. PATENT DOCUMENTS

| | | | | |
|---|---|---|---|---|
| 2012/0319514 | A1* | 12/2012 | Iwase | B60K 6/40 310/78 |
| 2014/0331945 | A1* | 11/2014 | Kasuya | F16D 25/123 123/2 |
| 2014/0342872 | A1* | 11/2014 | Imai | B60K 6/26 477/5 |

FOREIGN PATENT DOCUMENTS

| | | |
|---|---|---|
| JP | 2014-064433 A | 4/2014 |
| JP | 2016-067117 A | 4/2016 |

* cited by examiner

ROTARY ELECTRIC MACHINE

CROSS-REFERENCE TO RELATED APPLICATIONS

The present application claims the benefit of priority of Japanese Patent Application No. 2017-243002, filed on Dec. 19, 2017, the content of which is incorporated herein by reference.

TECHNICAL FIELD

The present invention relates to a rotary electric machine to be mounted on an electric vehicle or the like.

BACKGROUND ART

A rotary electric machine is mounted on an electric vehicle or the like. The rotary electric machine has heat sources such as a coil disposed in a stator and a permanent magnet disposed in a rotor that generates heat by operation, so that those need to be cooled. For example, JP-A-2014-64433 discloses that a guide groove is formed to extend spirally on an inner wall surface of a hollow rotor shaft and a coolant supplied to the inside of the rotor shaft is guided to a through hole formed radially in the rotor shaft by the operation of the rotating guide groove such that the flow rate of the delivered coolant is secured.

According to the rotor shaft of the rotary electric machine disclosed in JP-A-2014-64433, it is necessary to form the spiral guide groove on the inner wall surface of the hollow rotor shaft, and thus there is a concern that the rigidity of the rotor shaft decreases.

SUMMARY

Accordingly, an aspect of the present invention provides a rotary electric machine capable of sufficiently securing a flow rate of a coolant to be supplied from a rotor shaft to a rotor while preventing reduction in the rigidity of the rotor shaft.

According to an embodiment of the present invention, there is provided a rotary electric machine including:
a rotor; and
a rotor shaft connected to the rotor so as to be integrally rotatable and provided with a coolant flow path through which a coolant flows,
wherein the rotor shaft includes a first rotor shaft and a second rotor shaft which is inserted into the first rotor shaft and is connected to the first rotor shaft so as to be integrally rotatable,
wherein the first rotor shaft includes an opposing surface opposed to a tip surface of the second rotor shaft and a coolant supply path extending radially from a vicinity of the opposing surface,
wherein a gap is provided between the opposing surface of the first rotor shaft and the tip surface of the second rotor shaft, and
wherein the gap constitutes a connection flow path connecting the coolant flow path and the coolant supply path.

According to the above configuration, the gap is provided between the opposing surface of the first rotor shaft and the tip surface of the second rotor shaft, and this gap constitutes the connection flow path connecting the coolant flow path and the coolant supply path such that a flow rate of the coolant supplied from the rotor shaft to the rotor can be sufficiently secured. In addition, by using the gap provided between the opposing surface of the first rotor shaft and the tip surface of the second rotor shaft as the connection flow path, process of forming a flow path in the second rotor shaft can be omitted or reduced, and reduction in the rigidity of the second rotor shaft can be prevented.

DETAILED DESCRIPTION

Hereinafter, a rotary electric machine according to an embodiment of the invention will be described with reference to the accompanying drawings.

First, a vehicle driving device including a rotary electric machine according to the embodiment of the invention will be described.

Figure 1:
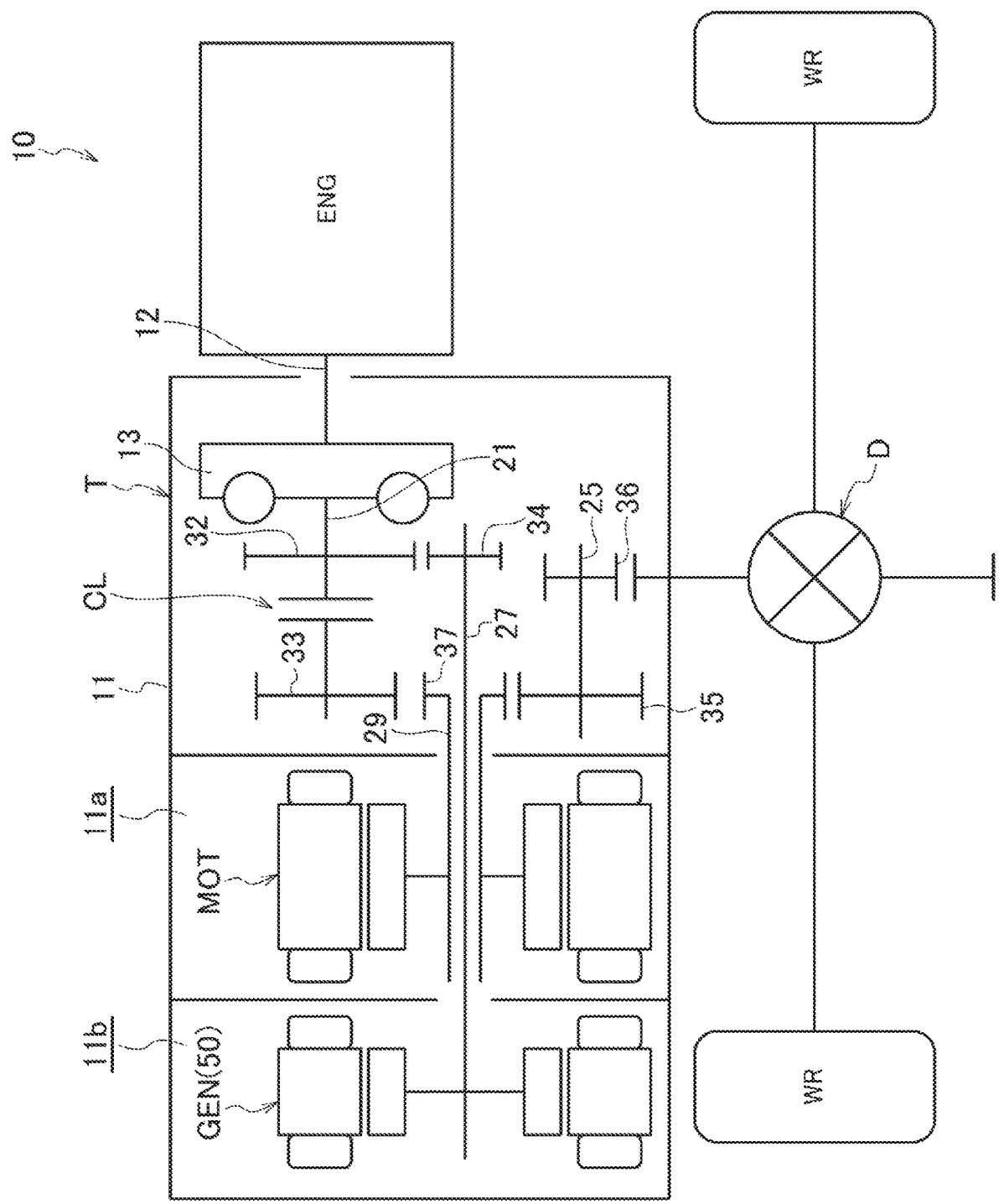
FIG. 1 is a schematic configuration diagram of a vehicle driving device including a rotary electric machine according to an embodiment of the invention.

As illustrated in FIG. 1, a vehicle driving device 10 including the rotary electric machine of the embodiment includes an engine ENG which is a driving source, a motor MOT, an electric generator GEN, and a transmission mechanism T. The motor MOT and the generator GEN are respectively disposed in a motor accommodation space 11a and a generator accommodation space 11b provided adjacent to each other in a case 11 so as to have rotation axes on the same straight line. The motor MOT and the generator GEN are connected to a battery (not illustrated) via a control device (not illustrated), so that electric power can be supplied from the battery and energy can be regenerated to the battery. Although the vehicle driving device 10 has two rotary electric machines of the motor MOT and the generator GEN, the generator GEN is the rotary electric machine 50 according to the embodiment of the invention.

In the transmission mechanism T, an input shaft 21 which is disposed on the same straight line as an engine output shaft 12 of the engine ENG and connected to the engine output shaft 12, a generator shaft 27 which is directly connected to the generator GEN, a motor shaft 29 which is directly connected to the motor MOT, and an output shaft 25 which is connected to a differential device D are disposed in parallel. The generator shaft 27 is inserted inside the motor shaft 29 so as to be relatively rotatable. In FIG. 1, reference numeral 13 denotes a damper which operates to reduce shock when power of the engine ENG is input to the input shaft 21.

In the input shaft 21, a first driving gear 32 and a second driving gear 33 are provided in this order from the engine ENG side to the motor MOT side, and further a clutch CL is provided between the first driving gear 32 and the second driving gear 33. By releasing or engaging the clutch CL, the power transmission between the first driving gear 32 and the second driving gear 33 is cut off or connected.

The generator shaft 27 is provided with a first driven gear 34 which meshes with the first driving gear 32 provided at the input shaft 21. Therefore, the engine ENG connected to the input shaft 21 and the generator GEN connected to the generator shaft 27 are connected such that power can be transmitted and electric power can be generated with the generator GEN by the power of the engine ENG.

The first driving gear 32 and the first driven gear 34 are configured as helical gears. A helical twisting direction is set such that, when a torque is input from the engine ENG to the generator GEN, a force in a direction (right direction in the drawing) away from the generator GEN side acts on the generator shaft 27. Conversely, the first driving gear 32 and the first driven gear 34 mesh with the generator shaft 27 such that a force in a direction (left direction in the drawing) close to the generator GEN side acts on the generator shaft 27 when a torque is output from the generator GEN. In this manner, by utilizing the thrust force generated during the rotation of the helical gear, the axial width of a gap C between an opposing surface 69 of a first rotor shaft 56 and a tip surface 68 of a second rotor shaft 57 which will be described below are automatically adjusted.

On the output shaft 25, a second driven gear 35 meshing with the second driving gear 33 provided at the input shaft 21 and an output gear 36 connected to the differential device D are provided from the motor MOT side to the engine ENG side in this order. Therefore, by engaging the clutch CL, the engine ENG connected to the input shaft 21 and wheels WR connected to the differential device D are connected such that power can be transmitted and a power transmission path is established in which the power of the engine ENG is transmitted to the wheels WR via the input shaft 21, the clutch CL, the second driving gear 33, the second driven gear 35, the output shaft 25, the output gear 36, and the differential device D. Engine travelling can be performed via this power transmission path. In this case, as described above, since the engine ENG connected to the input shaft 21 and the generator GEN connected to the generator shaft 27 are connected such that power can be transmitted, it is also possible to generate electric power with the generator GEN by the power of engine ENG.

In the motor shaft 29, a third driving gear 37 is provided on a side opposite to the motor MOT so as to be integrally rotatable. The third driving gear 37 meshes with the second driven gear 35 provided to the output shaft 25. Therefore, the motor MOT connected to the motor shaft 29 and the wheels WR connected to the differential device D are connected such that power can be transmitted and a power transmission path is established in which the power of the motor MOT is transmitted to the wheels WR via the third driving gear 37, the second driven gear 35, the output shaft 25, the output gear 36, and the differential device D. EV travelling can be performed by the motor MOT via this power transmission path.

Figure 2:
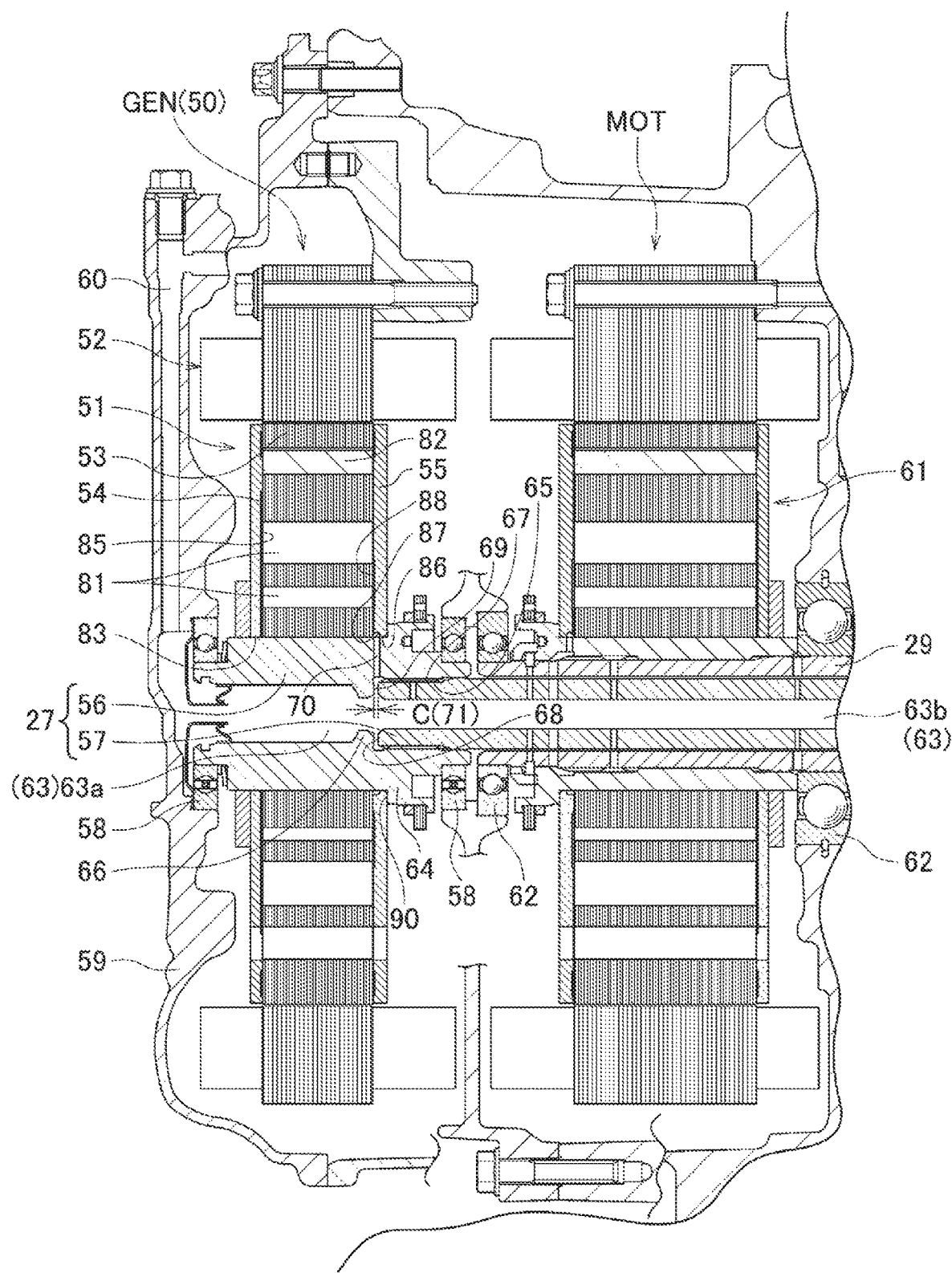
FIG. 2 is a cross-sectional view of the vehicle driving device of FIG. 1.

As illustrated in FIG. 2, the rotary electric machine (generator GEN) 50 according to the embodiment includes the generator shaft 27, a rotor 51, and a stator 52 which is disposed so as to face the outer diameter side of the rotor 51 with a slight gap therebetween. The rotor 51 includes a rotor core 53 which is supported by the generator shaft 27, a first end plate 54 which is disposed on one side of the rotor core 53 in the axial direction, and a second end plate 55 which is disposed on the other side of the rotor core 53 in the axial direction.

The generator shaft 27 includes the first rotor shaft 56 which is connected to the rotor 51 so as to be integrally rotatable by press-fitting the rotor 51, and the second rotor shaft 57 which is connected to the first rotor shaft 56 so as to be integrally rotatable by spline-fitting to the first rotor shaft 56. The first rotor shaft 56 is rotatably supported by a motor housing 59 via a pair of bearings 58. The second rotor shaft 57 is rotatably supported inside the motor shaft 29 which supports the rotor 61 of the motor MOT. The motor shaft 29 is rotatably supported by the motor housing 59 via bearings 62.

In the generator shaft 27, a coolant flow path 63 through which a coolant flows is formed. The coolant flow path 63 includes a coolant flow path 63a extending in the axial direction inside the first rotor shaft 56 and a coolant flow path 63b extending in the axial direction inside the second rotor shaft 57. As the coolant, for example, automatic transmission fluid (ATF) is used. The coolant flow paths 63a and 63b are connected to a circulation path 60 formed in the motor housing 59 constituting the case 11.

Figure 3:
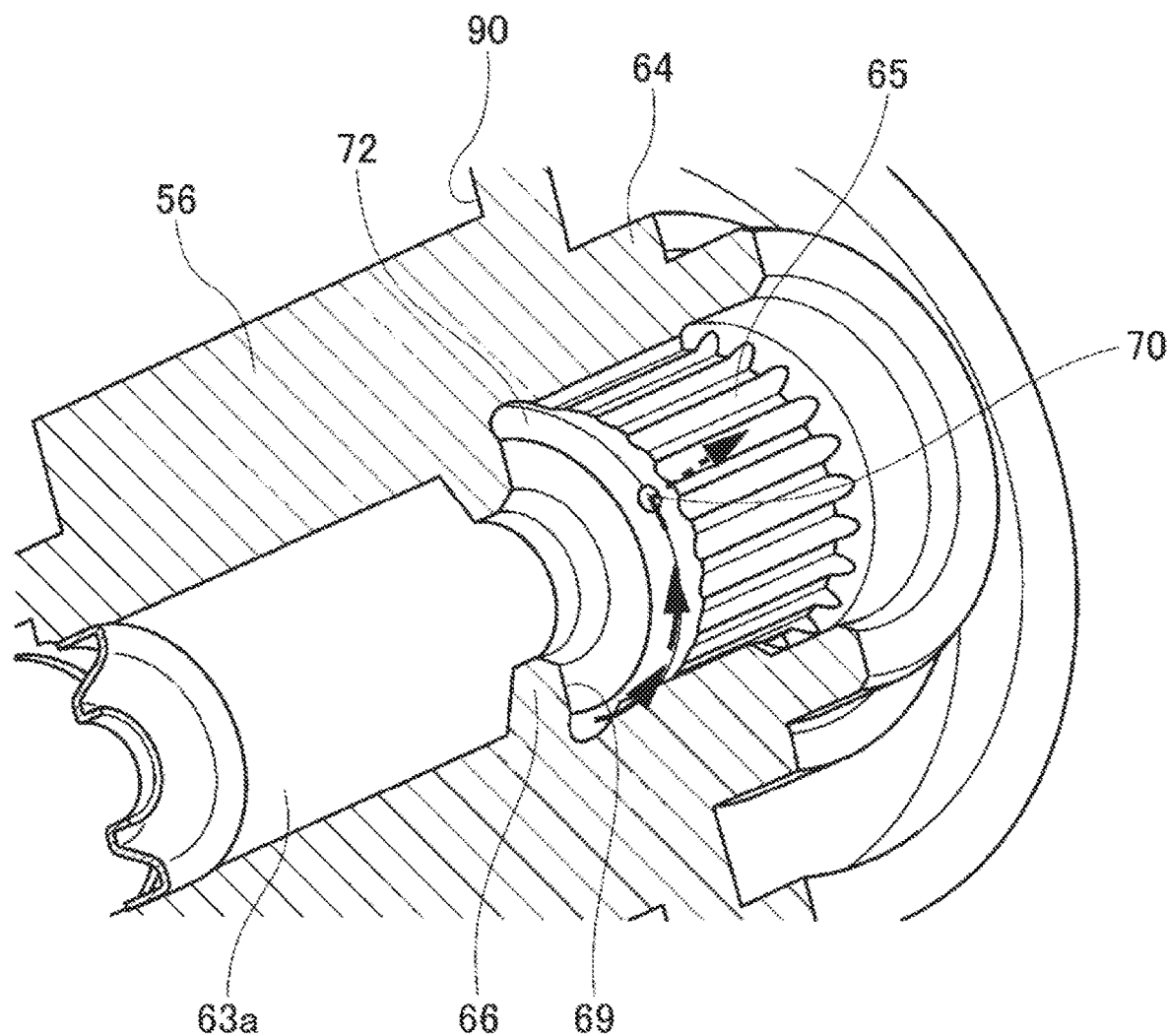
FIG. 3 is a perspective cross-sectional view of a first rotor shaft illustrated in FIG. 2.

Referring to FIG. 3, in the first rotor shaft 56, a ring-shaped protruding portion 66 protruding radially inward is formed at the motor MOT side end portion and a large diameter portion 64 protruding radially outward is formed further on the motor MOT side than the ring-shaped protruding portion 66. On the outer peripheral portion of the large diameter portion 64, there is provided a positioning portion 90 for positioning the second end plate 55 of the rotary electric machine 50. On the inner peripheral portion of the large diameter portion 64, a female spline 65 to which a male spline 67 formed in the second rotor shaft 57 is spline-fitted is formed. By spline-fitting the male spline 67 formed on the second rotor shaft 57 to the female spline 65 formed on the first rotor shaft 56, the first rotor shaft 56 and the second rotor shaft 57 are joined to each other to be relatively movable in the axial direction and to be restricted from the relative rotation. The inner peripheral surface of the large diameter portion 64 is larger in diameter than the inner peripheral surface of the ring-shaped protruding portion 66. The tip surface 68 of the second rotor shaft 57 and the opposing surface 69 which is the motor MOT side end surface of the ring-shaped protruding portion 66 face each other via the gap C.

The gap C constitutes a connection flow path 71 which connects the coolant flow path 63 and a coolant supply path 70. The coolant supply path 70 is formed so as to overlap the connection flow path 71 in the axial direction in the vicinity of the opposing surface 69 of the ring-shaped protruding portion 66 and passes through the first rotor shaft 56 in the radial direction. A plurality of coolant supply paths 70 are formed in the circumferential direction avoiding the press-fitting position of the rotor core 53 described below. As a result, the coolant flowing through the connection flow path 71 is smoothly introduced to the coolant supply path 70 by centrifugal force.

Figure 4:
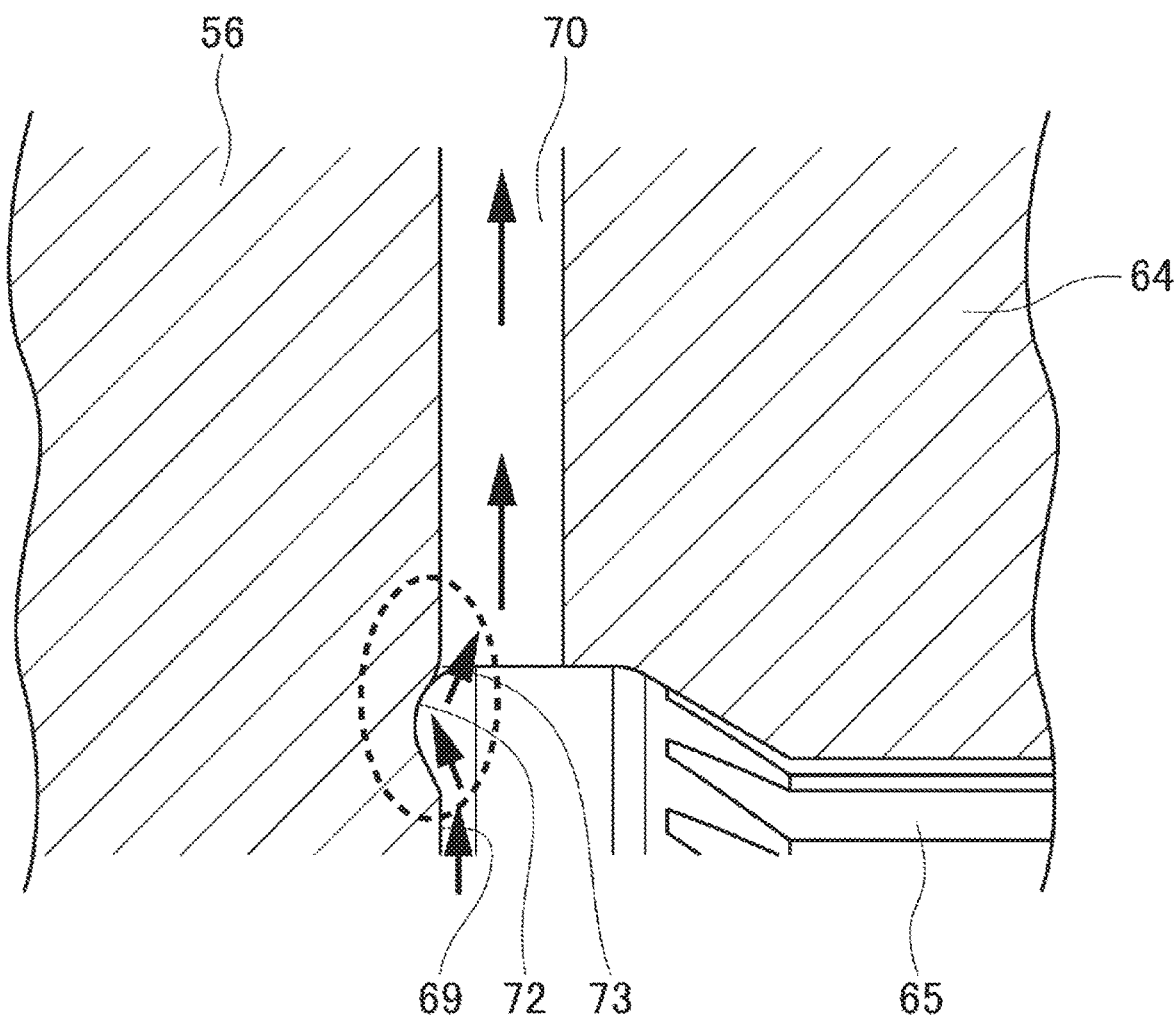
FIG. 4 is an enlarged cross-sectional view of a part of the first rotor shaft illustrated in FIG. 3.

On the opposing surface 69 of the first rotor shaft 56, as illustrated in FIG. 4, a recessed portion 72 having an annular shape is provided at the connection portion with the coolant supply path 70. A joining portion 73 between the recessed portion 72 and the coolant supply path 70 is formed in a curved shape in cross-sectional view. As the recessed portion 72 becomes a coolant reservoir, the coolant is stably supplied from the generator shaft 27 to the rotor 51. Further, the coolant of the connection flow path 71 is smoothly guided to the coolant supply path 70 by the curved shape of the joining portion 73. When the coolant supply path 70 is formed on the recessed portion 72, intermittent cutting is avoided when processing the coolant supply path 70, and therefore life span of a drill is improved and the cost is reduced.

Returning to FIG. 2, the rotor core 53 into which the first rotor shaft 56 is press-fitted is made by, for example, joining, such as crimping and bonding, a plurality of electromagnetic steel plates formed by press working and laminated in the axial direction. The rotor core 53 is provided with a plurality of through holes 81 formed on the outer diameter side and the inner diameter side so as to pass through the rotor core 53 in the axial direction. In addition, magnets 82 are disposed at equal intervals in the circumferential direction on the outer periphery portion of the rotor core 53. The magnets 82 are made of permanent magnet such as a neodymiwn magnet and the N pole and the S pole are aligned at a predetermined pitch to form the magnetic pole portion.

Figure 6:
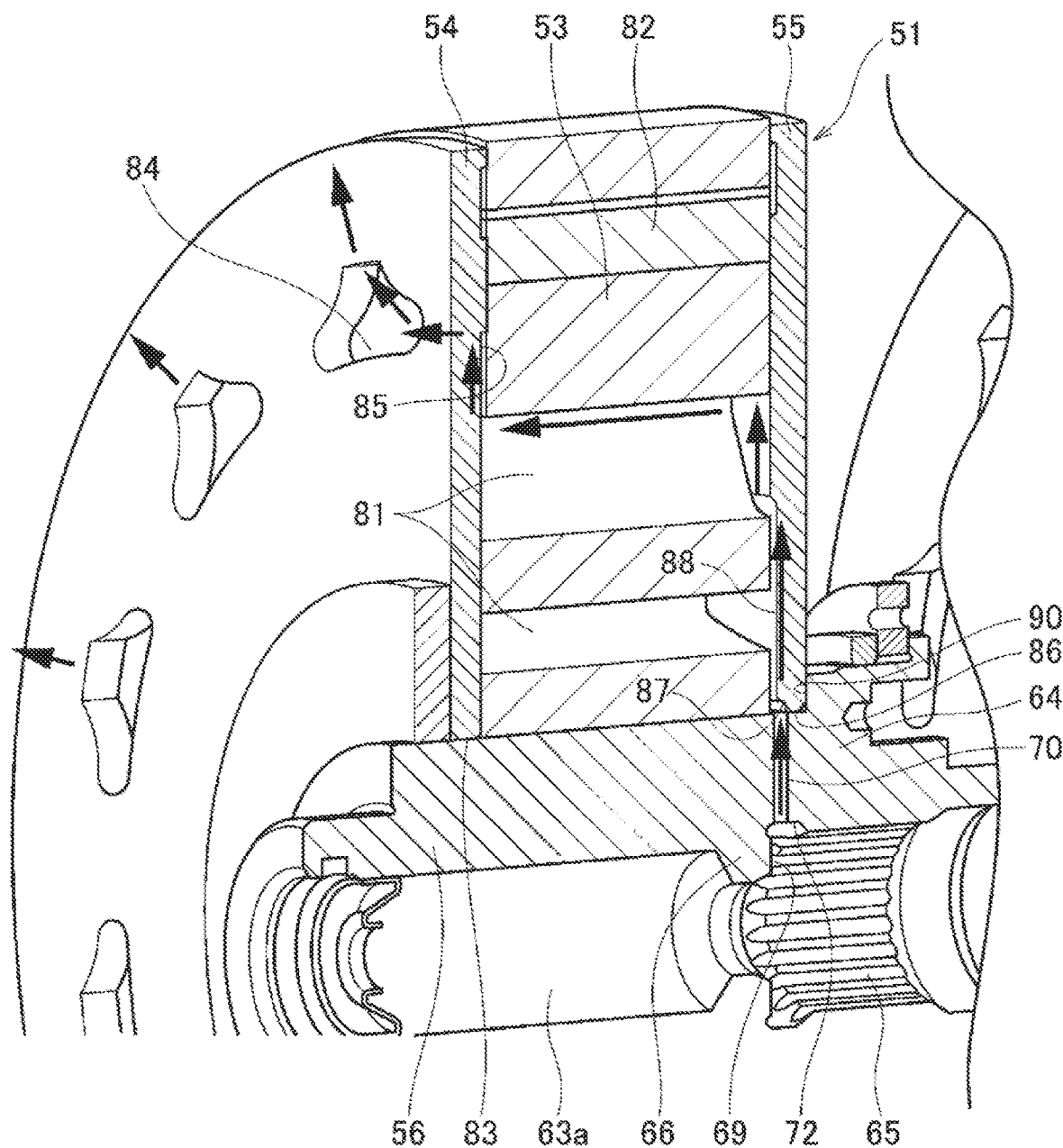
FIG. 6 is a perspective cross-sectional view illustrating a flow of the coolant of the rotary electric machine.

Referring to FIG. 6, the first end plate 54 is disposed to face an end surface on one axial side of the rotor core 53 and an insertion hole 83 through which the first rotor shaft 56 is inserted is formed at the center. Further on the outer side than the insertion hole 83 in the radial direction, discharge ports 84 are formed at equal intervals in the circumferential direction. A radial groove 85 connecting the through hole 81 on the outer diameter side and the discharge port 84 is formed on an inner surface of the first end plate 54 where the rotor core 53 abuts.

The second end plate 55 is disposed to face an end surface on the other axial side of the rotor core 53 and an insertion hole 86 through which the first rotor shaft 56 is inserted is formed at the center, and an annular groove 87 is formed in an inner-diameter-side corner portion of the insertion hole 86. A radial groove 88 connecting the coolant supply path 70 and the through hole 81 on the outer diameter side is formed on an inner surface of the second end plate 55 where the rotor core 53 abuts.

The first driven gear 34 (see FIG. 1) provided in the second rotor shaft 57 is a helical gear and operates as a gap adjusting mechanism configured to adjust the axial width of the gap C between the opposing surface 69 of the first rotor shaft 56 and the tip surface 68 of the second rotor shaft 57.

That is, the first driven gear (helical gear) 34 meshes such that a force in a direction (right direction in the drawing) away from the generator GEN side acts on the second rotor shaft 57 when torque is input from the engine ENG to the generator GEN (rotary electric machine 50). As a result, when torque is inputted from the engine ENG to the generator GEN, the axial width of the gap C between the tip surface 68 of the second rotor shaft 57 and the opposing surface 69 of the ring-shaped protruding portion 66 becomes wider. Therefore, a large amount of coolant can be supplied to the rotor 51 of the rotary electric machine 50 when cooling is required by electric power generation.

Accordingly, the gap adjusting mechanism mechanically and automatically adjusts the axial width of the gap C between the tip surface 68 of the second rotor shaft 57 and the opposing surface 69 of the ring-shaped protruding portion 66 in accordance with an operating situation of the vehicle driving device 10.

Figure 5:
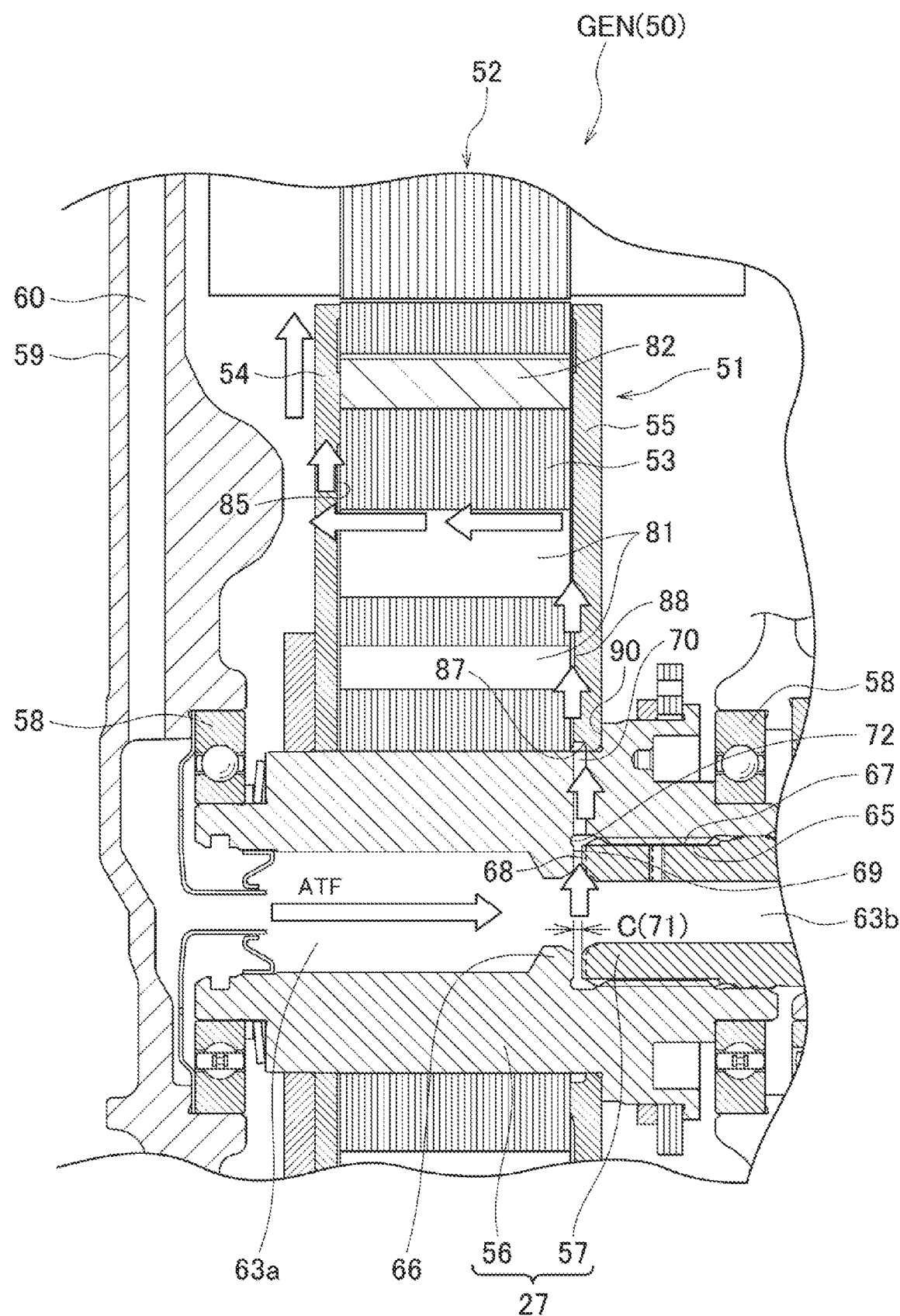
FIG. 5 is a cross-sectional view illustrating a flow of a coolant of the rotary electric machine.

Next, a cooling operation of the rotary electric machine 50 will be described with reference to FIGS. 5 and 6. The coolant is transferred by pressure by a coolant pump (not illustrated) and is supplied to the first rotor shaft 56 via the circulation path 60 formed in the motor housing 59. As indicated by an arrow in the drawing, the coolant supplied to the coolant flow path 63a is supplied from the connection flow path 71 to the coolant supply path 70 by centrifugal force. The connection flow path 71 is the gap C between the tip surface 68 of the second rotor shaft 57 and the opposing surface 69 of the ring-shaped protruding portion 66.

The coolant of the coolant supply path 70 is supplied to the through hole 81 via the annular groove 87 and the radial groove 88 of the second end plate 55 by centrifugal force acting on the coolant, and the coolant flows in the axial direction through the through hole 81 to cool the rotor core 53 from the inside.

The coolant passes from the through hole 81 on the outer diameter side through the radial groove 85 of the first end plate 54, and then is discharged from the discharge port 84 provided in the first end plate 54 out of the rotor 51. The coolant discharged from the discharge port 84 cools the coil of the stator 52, and the coolant is transferred by pressure again by the coolant pump and circulates through the circulation path 60.

The axial width of the connection flow path 71 which is the gap C between the tip surface 68 of the second rotor shaft 57 and the opposing surface 69 of the ring-shaped protruding portion 66 is automatically adjusted as the second rotor shaft 57 moves in the axial direction. Specifically, the first driven gear (helical gear) 34 operates as a gap adjusting mechanism, and the second rotor shaft 57 is moved in the right direction in the drawing to widen the gap C when cooling is required by electric power generation, for supplying more coolant to efficiently cool the rotor 51 from the inside.

The coolant supplied to the connection flow path 71 is introduced into the coolant supply path 70 by centrifugal force. On the opposing surface 69 of the first rotor shaft 56, the recessed portion 72 having an annular shape is provided at the connection portion with the coolant supply path 70, and thus the recessed portion 72 operates as a coolant reservoir to stably supply the coolant from the generator shaft 27 to the rotor 51.

Further, since the joining portion 73 between the recessed portion 72 and the coolant supply path 70 is formed in a curved shape in cross-sectional view, the coolant is smoothly guided to the coolant supply path 70 by the joining portion 73 having a curved shape. Furthermore, since the connection flow path 71 and the coolant supply path 70 overlap in the axial direction, there is no obstacle obstructing the flow of the coolant flowing through the connection flow path 71, and thus the coolant is smoothly supplied to the coolant supply path 70 by centrifugal force.

Modified Embodiment

Figure 7:
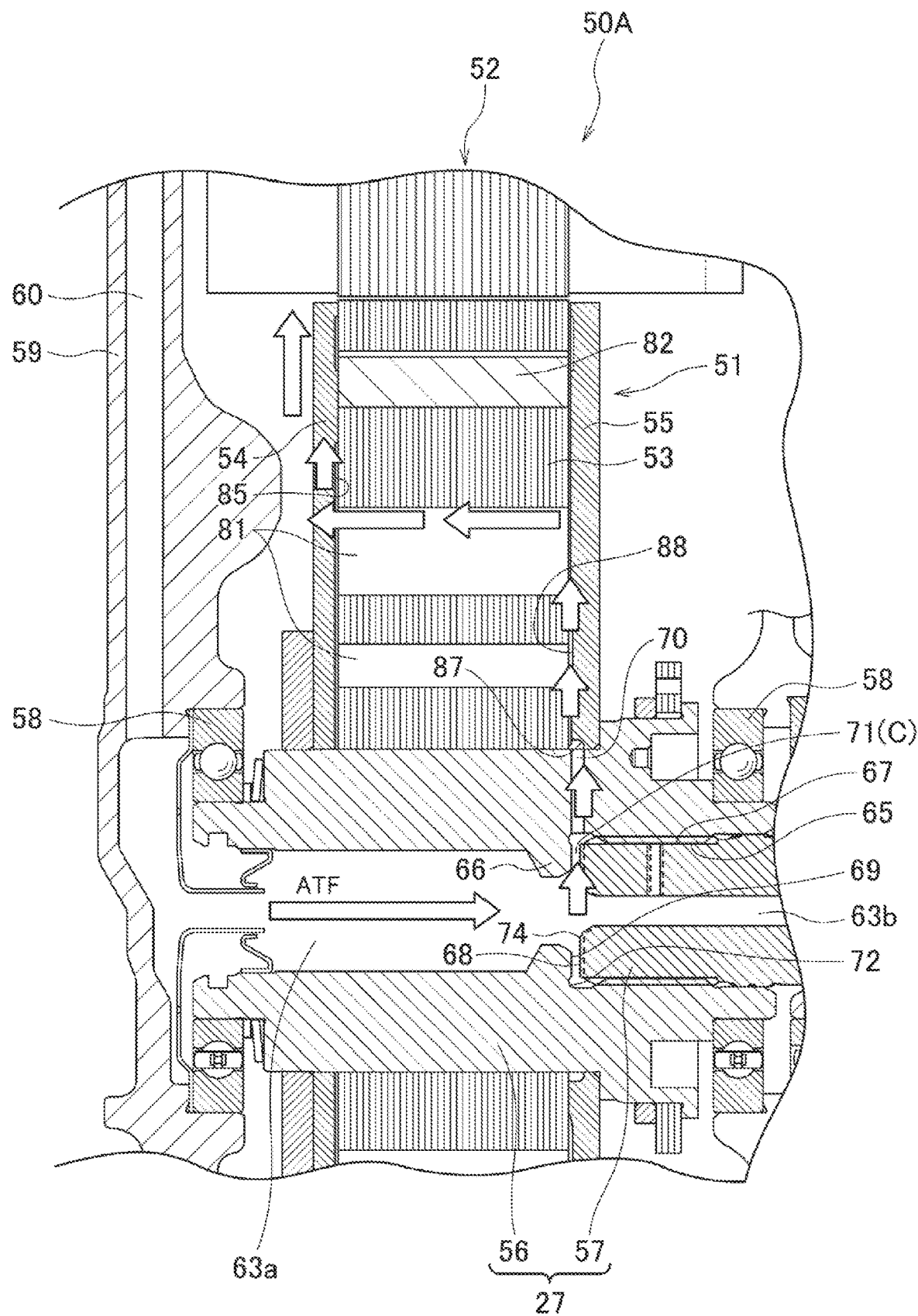
FIG. 7 is a cross-sectional view illustrating a flow of the coolant of the rotary electric machine according to a modified embodiment of the invention.

Next, a rotary electric machine 50A according to a modified embodiment of the invention will be described with reference to FIG. 7. The rotary electric machine 50A according to the modified embodiment is different from the rotary electric machine 50 of the above-described embodiment in that the inner diameter of the coolant flow path 63b of the second rotor shaft 57 is smaller than the coolant flow path 63h of the rotary electric machine 50 of the above-described embodiment. In the following description, the same constituent elements as those of the rotary electric machine 50 of the above-described embodiment are denoted by the same reference numerals and the description thereof will be omitted or simplified.

In the rotary electric machine 50A according to the modified embodiment, the inner diameter of the coolant flow path 63b of the second rotor shaft 57 is smaller than the coolant flow path 63a of the first rotor shaft 56 and smaller than the inner diameter of the ring-shaped protruding portion 66.

As a result, a part (inner diameter side) of the tip surface 68 of the second rotor shaft 57 protrudes radially inward than the ring-shaped protruding portion 66 in cross-sectional view. The inner diameter side portion of the tip surface 68 serves as a guide surface 74 that guides the coolant flowing through the coolant flow path 63a to the connection flow path 71. That is, since the coolant flowing in the coolant flow path 63a in an arrow direction (right direction in the drawing) reaches the guide surface 74 and the direction thereof is bent by 90°, and the coolant is guided to the connection flow path 71, the supply amount of the coolant from the first rotor shaft 56 to the rotor 51 increases. Therefore, the rotary electric machine 50A can be further cooled.

The rotary electric machines 50 and 50A of the embodiment and the modified embodiment described above can be appropriately modified, improved, and the like.

For example, in the embodiment described above, the electric generator is exemplified as the rotary electric machine, but the rotary electric machine may be an electric motor. In this case, it is preferable that the gap adjusting mechanism be set such that the gap becomes wider when torque is output from the electric motor.

In the meantime, at least the following subject matters are described in the specification. Although the corresponding constituent elements or the like in the embodiment described above is shown in parentheses, the invention is not limited thereto.

(1) A rotary electric machine (rotary electric machine 50, 50A) includes:

a rotor (rotor 51); and a rotor shaft (generator shaft 27) connected to the rotor so as to be integrally rotatable and provided with a coolant flow path (coolant flow path 63) through which a coolant flows, wherein the rotor shaft includes a first rotor shaft (first rotor shaft 56) and a second rotor shaft (second rotor shaft 57) which is inserted into the first rotor shaft and is connected to the first rotor shaft so as to be integrally rotatable, wherein the first rotor shaft includes an opposing surface (opposing surface 69) opposed to a tip surface (tip surface 68) of the second rotor shaft and a coolant supply path (coolant supply path 70) extending radially from a vicinity of the opposing surface, wherein a gap (gap C) is provided between the opposing surface of the first rotor shaft and the tip surface of the second rotor shaft; and wherein the gap constitutes a connection flow path (connection flow path 71) connecting the coolant flow path and the coolant supply path.

According to (1), by providing the gap between the opposing surface of the first rotor shaft and the tip surface of the second rotor shaft and using the gap as the connection flow path connecting the coolant flow path and the coolant supply path, the flow rate of the coolant supplied from the rotor shaft to the rotor can be sufficiently secured. In addition, by using the gap provided between the opposing surface of the first rotor shaft and the tip surface of the second rotor shaft as the connection flow path, process of forming the flow path in the second rotor shaft can be omitted or reduced, and further reduction in the rigidity of the second rotor shaft can be prevented.

(2) In the rotary electric machine according to (1), the gap and the coolant supply path overlap in an axial direction.

According to (2), since the gap and the coolant supply path overlap in the axial direction, the coolant flowing through the gap is smoothly introduced to the coolant supply path by centrifugal force. As a result, the supply amount of the coolant from the rotor shaft to the rotor can be increased.

(3) in the rotary electric machine according to (1) or (2), the rotor shaft includes a gap adjusting mechanism (helical gear) configured to adjust an axial width of the gap.

According to (3), by adjusting the axial width of the gap by the gap adjusting mechanism, it is possible to adjust the supply amount of the coolant to the rotor.

(4) In the rotary electric machine according to (3), the gap adjusting mechanism includes a helical gear (first driven gear 34) provided at the second rotor shaft.

According to (4), since the gap adjusting mechanism includes a helical gear provided at the second rotor shaft, the axial width of the gap can be mechanically and automatically adjusted.

(5) In the rotary electric machine according to (4), the rotary electric machine is an electric generator (generator GEN), and the helical gear meshes such that the tip surface of the second rotor shaft moves away from the opposing surface of the first rotor shaft when torque is input from a driving source (engine ENG) to the electric generator.

According to (5), when the rotary electric machine is an electric generator, the axial width of the gap becomes wider when torque is input from the drive source to the generator, so that it is possible to supply a large amount of the coolant to the rotor when cooling is required by electric power generation.

(6) In the rotary electric machine according to (4), the rotary electric machine is an electric motor, and the helical gear meshes such that the tip surface of the second rotor shaft moves away from the opposing surface of the first rotor shaft when torque is output from the electric motor.

According to (6), when the rotary electric machine is an electric motor, the axial width of the gap becomes wider when torque is output from the electric motor, so that it is possible to supply a large amount of the coolant to the rotor when cooling is required by power running drive.

(7) in the rotary electric machine according to (2), the opposing surface is provided with a recessed portion (recessed portion 72) having an annular shape at a connection portion with the coolant supply path.

According to (7), since the recessed portion having an annular shape is formed in the opposing surface at the connection portion with the coolant supply path, the recessed portion serves as a coolant reservoir, so that it is possible to stably supply the coolant from the rotor shaft to the rotor.

(8) In the rotary electric machine according to (7).

a joining portion (joining portion 73) between the recessed portion provided at the opposing surface and the coolant supply path has a curved shape in cross-sectional view.

According to (8), since the joining portion between the recessed portion provided at the opposing surface and the coolant supply path has a curved shape in cross-sectional view, it is possible for the coolant to smoothly flow from the recessed portion, which is the coolant reservoir, to the coolant supply path.

(9) In the rotary electric machine according to any one of (1) to (8), one of the opposing surface of the first rotor shaft and the tip surface of the second rotor shaft has a smaller inner diameter than the other and constitutes a guide surface (guide surface 74) that guides the coolant flowing through the coolant flow path to the gap.

According to (9), by setting the radial size of one of the opposing surface of the first rotor shaft and the tip surface of the second rotor shaft to be smaller than the other and making it serve as the guide surface for guiding the coolant flowing through the coolant flow path to the gap, the supply amount of the coolant from the rotor shaft to the rotor can be increased.

The invention claimed is:

1. A rotary electric machine comprising:
    a rotor; and
    a rotor shaft connected to the rotor so as to be integrally rotatable and provided with a coolant flow path through which a coolant flows,
    wherein the rotor shaft includes a first rotor shaft and a second rotor shaft which is inserted into the first rotor shaft and is connected to the first rotor shaft so as to be integrally rotatable,
    wherein the first rotor shaft includes an opposing surface opposed to a tip surface of the second rotor shaft, and a coolant supply path extending radially from a vicinity of the opposing surface,
    wherein a gap is provided between the opposing surface of the first rotor shaft and the tip surface of the second rotor shaft,
    wherein the gap constitutes a connection flow path connecting the coolant flow path and the coolant supply path, and
    wherein the rotor shaft includes a gap adjusting mechanism configured to adjust an axial width of the gap.

2. The rotary electric machine according to claim 1, wherein the gap and the coolant supply path overlap in an axial direction.

3. The rotary electric machine according to claim 2, wherein the opposing surface includes a recessed portion having an annular shape at a connection portion with the coolant supply path.

4. The rotary electric machine according to claim 3, wherein a joining portion between the recessed portion provided at the opposing surface and the coolant supply path has a curved shape in cross-sectional view.

5. The rotary electric machine according to claim 1, wherein the gap adjusting mechanism includes a helical gear provided at the second rotor shaft.

6. The rotary electric machine according to claim 5, wherein the rotary electric machine is an electric generator, and
    wherein the helical gear meshes such that the tip surface of the second rotor shaft moves away from the opposing surface of the first rotor shaft when torque is input from a driving source to the electric generator.

7. The rotary electric machine according to claim 5, wherein the rotary electric machine is an electric motor, and
    wherein the helical gear meshes such that the tip surface of the second rotor shaft moves away from the opposing surface of the first rotor shaft when torque is output from the electric motor.

8. The rotary electric machine according to claim 1, wherein one of the opposing surface of the first rotor shaft and the tip surface of the second rotor shaft has a smaller inner diameter than the other and constitutes a guide surface that guides the coolant flowing through the coolant flow path to the gap.

* * * * *